US012789725B2

(12) United States Patent
Allen et al.

(10) Patent No.: US 12,789,725 B2
(45) Date of Patent: Nov. 10, 2026

(54) SYSTEM, APPARATUS, AND METHOD FOR AUTOMATICALLY DETECTED AND CONFIGURED VEHICLE ACCESSORIES

(71) Applicant: SCOUT MOTORS INC., Tysons, VA (US)

(72) Inventors: Evan Allen, Hazel Park, MI (US); Jason Meyer Quint, Ann Arbor, MI (US)

(73) Assignee: Scout Motors Inc., VA (US)

( * ) Notice: Subject to any disclaimer, the term of this patent is extended or adjusted under 35 U.S.C. 154(b) by 76 days.

(21) Appl. No.: 18/614,261

(22) Filed: Mar. 22, 2024

(65) Prior Publication Data

US 2025/0296518 A1 Sep. 25, 2025

(51) Int. Cl.
*B60R 16/023* (2006.01)
*B60R 16/03* (2006.01)

(52) U.S. Cl.
CPC .......... *B60R 16/0231* (2013.01); *B60R 16/03* (2013.01)

(58) Field of Classification Search
CPC ............................ B60R 16/03; B60R 16/0231
See application file for complete search history.

(56) References Cited

U.S. PATENT DOCUMENTS 7,050,783 B2 * 5/2006 Curtiss ............. H04M 1/72409 455/418
10,266,134 B2 * 4/2019 Brombach ........... B60N 2/5678
11,072,256 B2 * 7/2021 Butler ..................... B60L 53/22
11,683,693 B1 6/2023 Bayer et al.
12,043,241 B2 * 7/2024 Follen ........................ B60L 7/10
12,342,171 B2 * 6/2025 Bayer ........................ G06F 8/65
2011/0167287 A1 * 7/2011 Walsh ................... G06F 1/3209 713/323
2013/0232349 A1 * 9/2013 Oler .......................... G06F 1/26 713/300
2014/0075051 A1 * 3/2014 Zadesky .............. G06F 13/122 710/3

(Continued)

FOREIGN PATENT DOCUMENTS

CN 106776681 A * 5/2017 ............. G06Q 10/20

OTHER PUBLICATIONS

"Huo, Chengjia; A Centralized IoT Middleware System for Devices Working Across Application Domains Using Self-descriptive Capability Profile; 2014; UC Irvine Electronic Theses and Dissertations" (Year: 2014).*

*Primary Examiner* — Ramya P Burgess
*Assistant Examiner* — Christopher R Cardimino
(74) *Attorney, Agent, or Firm* — Alston & Bird LLP

(57) ABSTRACT

Provided herein are a system, method, and apparatus for automatically detecting and configuring vehicle accessories. A method includes: receiving an indication of an accessory device connected to a connection point of a vehicle; receiving accessory information from the accessory device; receiving, from the vehicle, an operational state of the vehicle; and providing power to the accessory device based on the accessory information and the operational state of the vehicle. The accessory information can include an indication of at least one operational state of the vehicle in which power is to be provided to the accessory device. The accessory information can include an indication of at least one operational state of the vehicle in which power is not to be provided to the accessory device.

20 Claims, 8 Drawing Sheets

(56) References Cited

U.S. PATENT DOCUMENTS

| | | | | |
|---|---|---|---|---|
| 2017/0026236 | A1* | 1/2017 | Falk | H04L 12/40078 |
| 2020/0198561 | A1* | 6/2020 | Weed | B60K 35/10 |
| 2023/0388803 | A1* | 11/2023 | Bayer | G06F 8/65 |
| 2024/0092168 | A1* | 3/2024 | Moffatt | B60K 35/00 |

* cited by examiner

| | Key Not Present | Key Present | Accessory Mode | Run Mode | | | | | Dimmable? |
|---|---|---|---|---|---|---|---|---|---|
| | | | | Park | Reverse | Drive | | Off-Road | |
| | | | | | | <30mph | ≥30mph | | |
| Winch | No | Yes | Yes | Yes | No | No | No | Yes | No |
| Camera (Dash Cam) | No | No | Yes | Yes | Yes | Yes | Yes | Yes | No |
| Camera (Wheel Cam) | No | No | No | No | No | Yes | No | Yes | No |
| Fog Lights | No | No | Yes | Yes | Yes | Yes | Yes | Yes | Yes |
| Off-Road Lights | No | No | Yes | Yes | Yes | Yes | No | Yes | Yes |
| Area Lights | Yes | Yes | Yes | Yes | Yes | No | No | No | Yes |
| Refrigerated Cooler | Yes | Yes | Yes | Yes | Yes | Yes | Yes | Yes | No |
| Air Compressor | No | No | Yes | Yes | Yes | No | No | Yes | No |
| Portable Power Station | Yes | Yes | Yes | Yes | Yes | Yes | Yes | Yes | No |
| Radio | No | No | Yes | Yes | Yes | Yes | Yes | Yes | No |
| Phone | Yes | Yes | Yes | Yes | Yes | Yes | Yes | Yes | No |
| Emergency Lights | Yes | Yes | Yes | Yes | Yes | Yes | Yes | Yes | No |
| Gauges | No | No | Yes | Yes | Yes | Yes | Yes | Yes | No |
| USB Power Strip | Yes | Yes | Yes | Yes | Yes | Yes | Yes | Yes | No |

FIG. 2

| Data | Bits | Permutations (2^bits) | Notes |
|---|---|---|---|
| address | 16 | 65536 | reserve 0x0000 and 0xFFFF |
| dimming | 1 | 2 | this allows the 12v driving the load to be PWM-ed |
| inhibit above speed | 8 | 256 | reserve 255 for uninhibited, otherwise 0-254 in KPH |
| inhibit on road | 1 | 2 | 1 means uninhibited |
| inhibit in off-road | 1 | 2 | 1 means uninhibited |
| inhibit in accessory | 1 | 2 | 1 means uninhibited |
| inhibit in park | 1 | 2 | 1 means uninhibited |
| inhibit in reverse | 1 | 2 | 1 means uninhibited |
| inhibit in drive | 1 | 2 | 1 means uninhibited |
| max duty cycle | 8 | 256 | reserve 0 as something, otherwise 1/256 to 256/256 instead of % |
| max on time | 16 | 65536 | reserve 0 as no max on time, otherwise 1-65536 seconds (18 hours) max on time |
| max allowed current draw | 8 | 256 | reserve 0 as something, otherwise each bit indicates 140mA up to just over 35A |

FIG. 3

SYSTEM, APPARATUS, AND METHOD FOR AUTOMATICALLY DETECTED AND CONFIGURED VEHICLE ACCESSORIES

TECHNOLOGICAL FIELD

An example embodiment of the present disclosure relates generally to automatically detecting accessories, and more particularly, to automatic detection and configuration of accessories for a vehicle upon connection of the accessory.

BACKGROUND

Modern vehicles have available a litany of options that lend to personalization and customization from the factory. However, vehicle accessorizing remains popular for a multitude of reasons. While some individuals aim to accessorize their vehicle for a particular purpose or utility function, customization can also be purely aesthetic or decorative.

Vehicle accessorizing generally relates to hardware that is added to a vehicle post-manufacture. These accessories can be the original equipment manufacturer's (OEM's) products that are designed to operate with their vehicles or aftermarket products made by third party manufacturers. The types of accessories available are widely varied, with many vehicle accessories being universal or generic and compatible with any vehicle on the market.

The process of installation of accessories varies according to the type of accessory, the complexity of the accessory, and its interface with a vehicle. While some accessories are designed to be easily installed by vehicle owners requiring little automotive knowledge, other accessories are complex and generally require a professional installer. The cost associated with an accessory is wide ranging, though installation costs can substantially increase the cost and even exceed a cost of the accessory itself.

BRIEF SUMMARY

A system, apparatus, and method are therefore provided for automatic detection and configuration of accessories for a vehicle upon connection of the accessory. Embodiments provided herein include at least one processor and at least one non-transitory memory including computer program code instructions, the computer program code instructions configured to, when executed, cause the apparatus to at least: receive an indication of an accessory device connected to a connection point of a vehicle; receive accessory information from the accessory device; receive, from the vehicle, an operational state of the vehicle; and provide power to the accessory device based on the accessory information and the operational state of the vehicle.

According to some embodiments, the accessory information includes an indication of at least one operational state of the vehicle in which power is to be provided to the accessory device. According to certain embodiments, the accessory information further includes an indication of at least one operational state of the vehicle in which power is not to be provided to the accessory device. According to some embodiments, the at least one operational state includes at least one of: a vehicle speed, a vehicle accessory mode, a vehicle run mode, a vehicle park engaged, a vehicle reverse engaged, a vehicle drive engaged, a vehicle door open status, or a vehicle door lock status.

The accessory information of some embodiments further includes at least one of: a maximum duty cycle, a maximum allowed current draw, or a maximum continuous on time. According to an example embodiment, causing the apparatus to provide power to the accessory device based on the accessory information and the operational state of the vehicle includes causing the apparatus to provide a level of power to the accessory device specified in the accessory information. According to certain embodiments, causing the apparatus to receive accessory information from the accessory device includes causing the apparatus to receive accessory information via a single wire that is not used to power the accessory device. The accessory information of some embodiments further includes an indication of configurability of the accessory device, where the indication of configurability is provided to the vehicle, and where a configuration of the accessory device is received from the vehicle, where the apparatus is further configured to provide power to the accessory device based on the accessory information, the operational state of the vehicle, and the configuration of the accessory device.

Embodiments provided herein include a method for operating a vehicle accessory including: receiving an indication of an accessory device connected to a connection point of a vehicle; receiving accessory information from the accessory device; receiving, from the vehicle, an operational state of the vehicle; and providing power to the accessory device based on the accessory information and the operational state of the vehicle. According to some embodiments, the accessory information includes an indication of at least one operational state of the vehicle in which power is to be provided to the accessory device. The accessory information of some embodiments further includes an indication of at least one operational state of the vehicle in which power is not to be provided to the accessory device.

According to certain embodiments, the at least one operational state includes at least one of: a vehicle speed, a vehicle accessory mode, a vehicle run mode, a vehicle park engaged, a vehicle reverse engaged, a vehicle drive engaged, a vehicle door open status, or a vehicle door lock status. The accessory information of some embodiments further includes at least one of: a maximum duty cycle, a maximum allowed current draw, or a maximum continuous on time. According to some embodiments, providing power to the accessory device based on the accessory information and the operational state of the vehicle includes providing a level of power to the accessory device specified in the accessory information.

Receiving accessory information from the accessory device includes, in some embodiments, receiving accessory information via a single wire that is not used to power the accessory device. The accessory information of some embodiments further includes an indication of configurability of the accessory device, where the indication of configurability is provided to the vehicle, and where a configuration of the accessory device is received from the vehicle, where the method further includes providing power to the accessory device based on the accessory information, the operational state of the vehicle, and the configuration of the accessory device. The method of some embodiments further includes: receiving an indication that a new accessory is present within the vehicle; and providing for display of a user-interface including options for configuring the vehicle according to one or more properties of the new accessory.

Embodiments provided herein include a computer program product including at least one non-transitory computer-readable storage medium having computer-executable program code portions stored therein, the computer-executable program code portions including program code instructions configured to: receive an indication of an accessory device connected to a connection point of a vehicle; receive accessory information from the accessory device; receive, from the vehicle, an operational state of the vehicle; and provide power to the accessory device based on the accessory information and the operational state of the vehicle. The accessory information of some embodiments includes an indication of at least one operational state of the vehicle in which power is to be provided to the accessory device. The accessory information of some embodiments further includes an indication of at least one operational state of the vehicle in which power is not to be provided to the accessory device.

Embodiments provided herein include a method of connecting an accessory to a vehicle including: receiving an indication of connection of a power wire of the accessory to a power source; providing, via a wired connection, an identification of the accessory to the vehicle; receiving power from the vehicle via the power wire based on the identification of the accessory, where at least one of a supplied power level, a supplied power frequency, or a supplied power schedule differs based on the identification of the accessory. According to some embodiments the wired connection comprises a single wire.

The method of some embodiments further includes storing, on a memory of the accessory, the identification of the accessory. According to some embodiments, the identification includes one or more flags, where the one or more flags include one or more of: a mode of operation according to a vehicle state, a mode of operation according to a vehicle speed, a mode of operation according to a presence of a key, a maximum current draw, a maximum on time, or a dimming capability of the accessory. According to certain embodiments the identification of the accessory provides an indication to the vehicle of one or more configurable parameters of the accessory.

Embodiments provided herein include an accessory for a vehicle including: a power connection; a communication connection; a memory, where the memory contains an identification of the accessory, where the identification indicates to the vehicle at least one of a required power level, a required power frequency, or a required power schedule of the accessory. According to some embodiments the communication connection is a single wire. According to certain embodiments, the identification includes one or more flags, where the one or more flags include one or more of: a mode of operation according to a vehicle state, a mode of operation according to a vehicle speed, a mode of operation according to a presence of a key, a maximum current draw, a maximum on time, or a dimming capability of the accessory. According to some embodiments, the identification of the accessory provides an indication to the vehicle of one or more configurable parameters of the accessory.

BRIEF DESCRIPTION OF THE DRAWINGS

Figure 1:
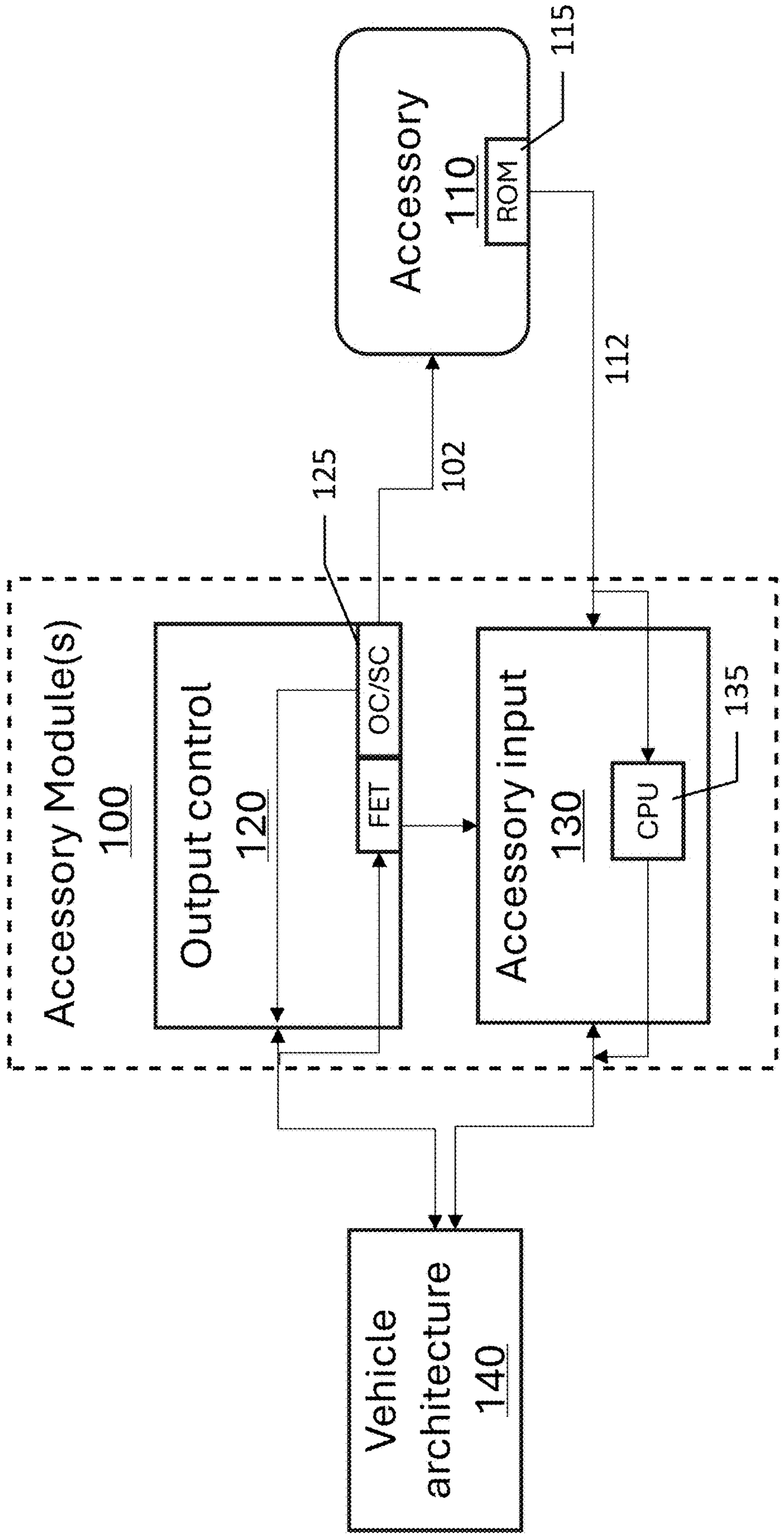
Figure 4:
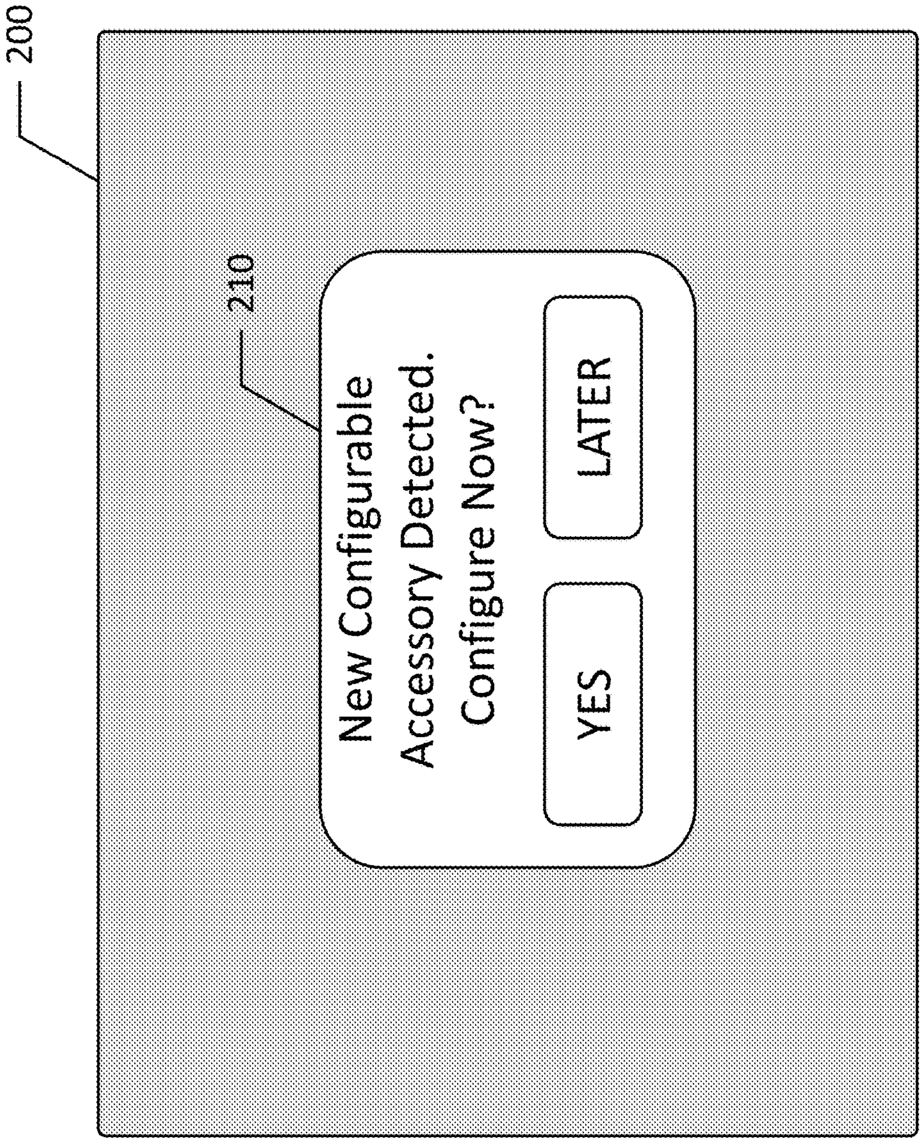
Figure 5:
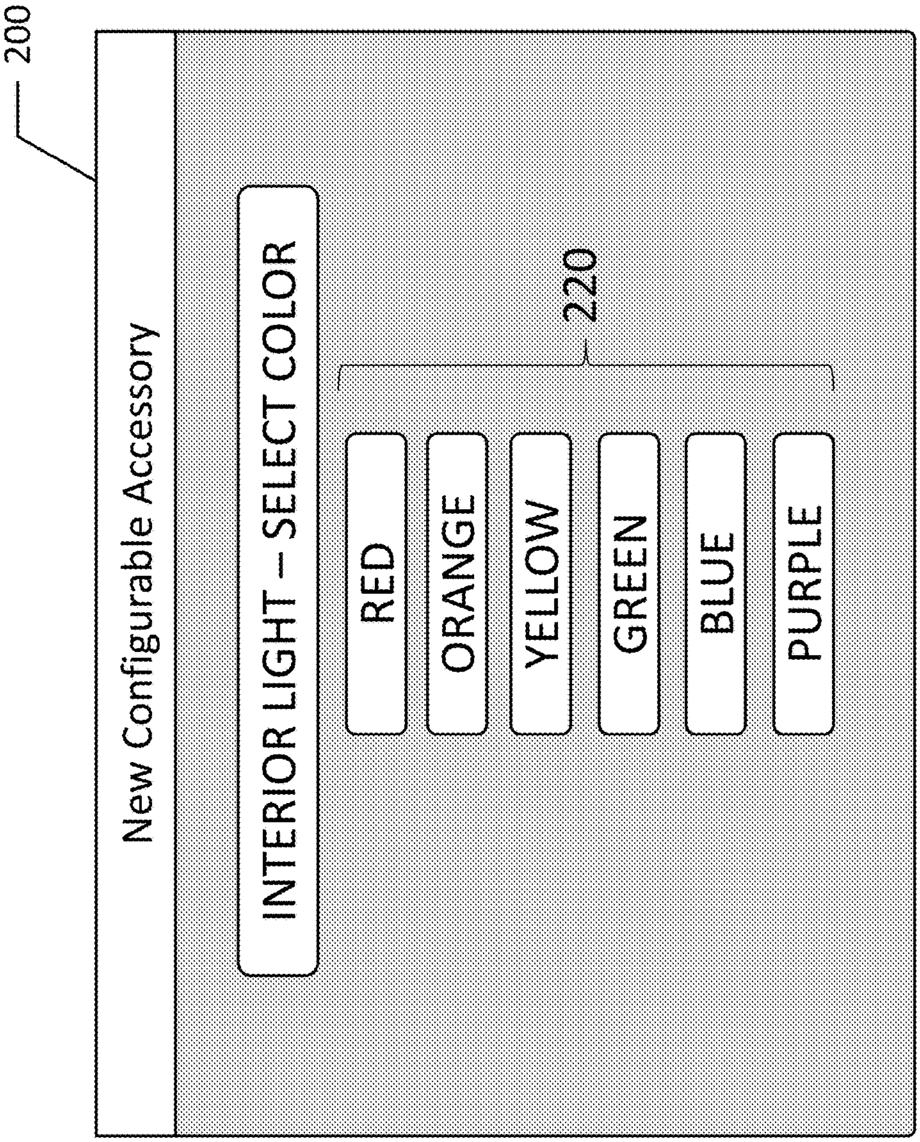
Figure 6:
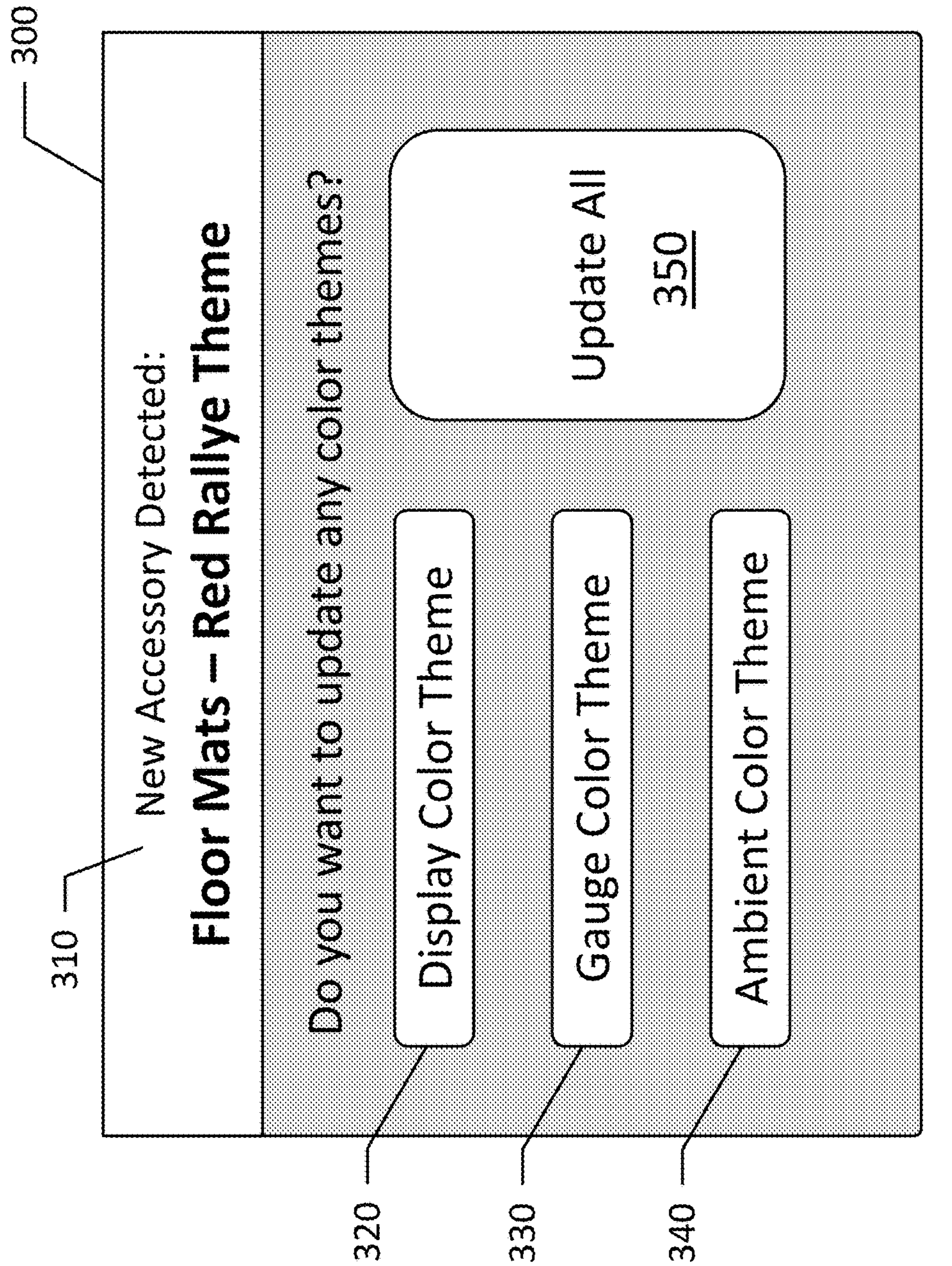
Figure 7:
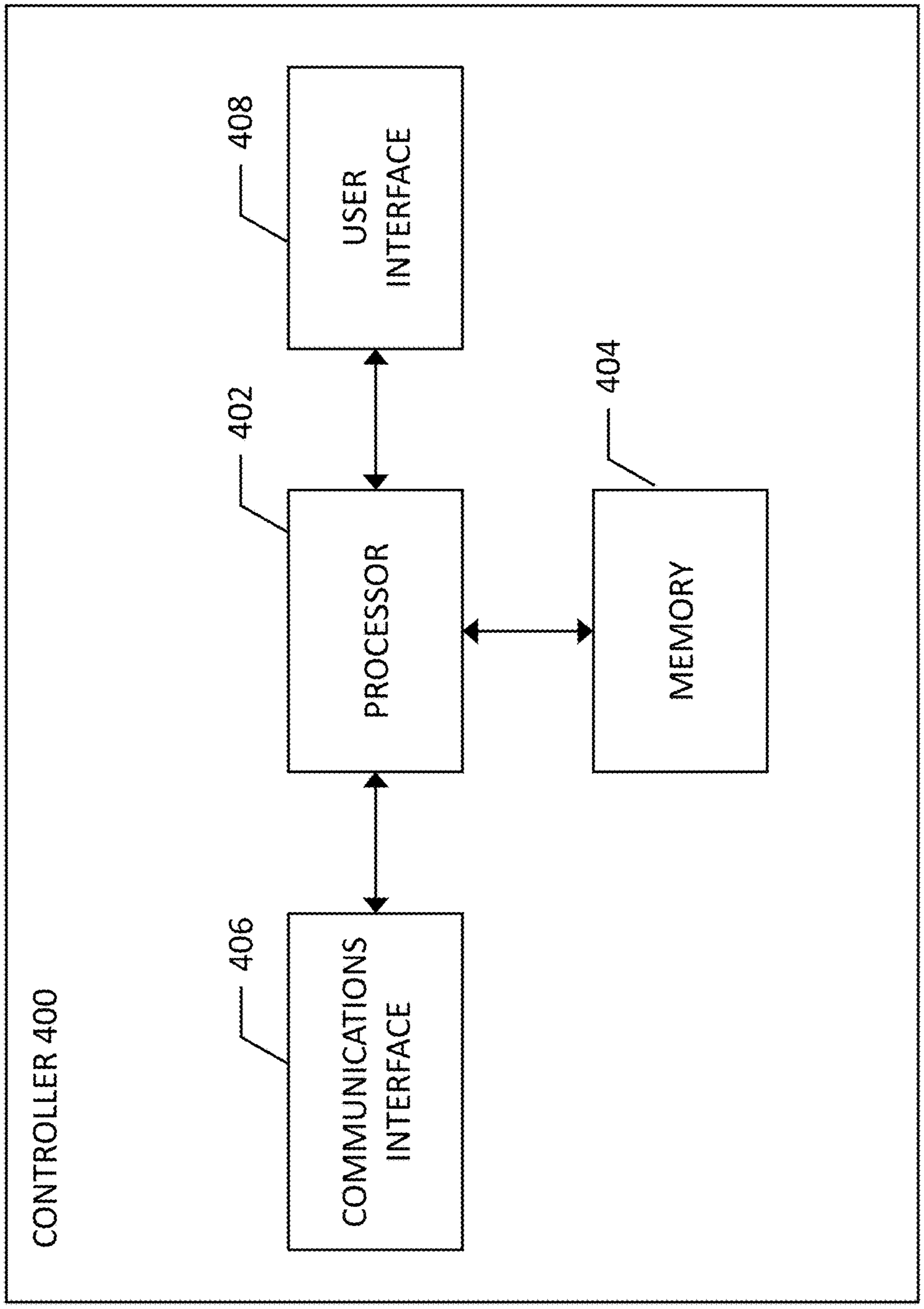
Figure 8:
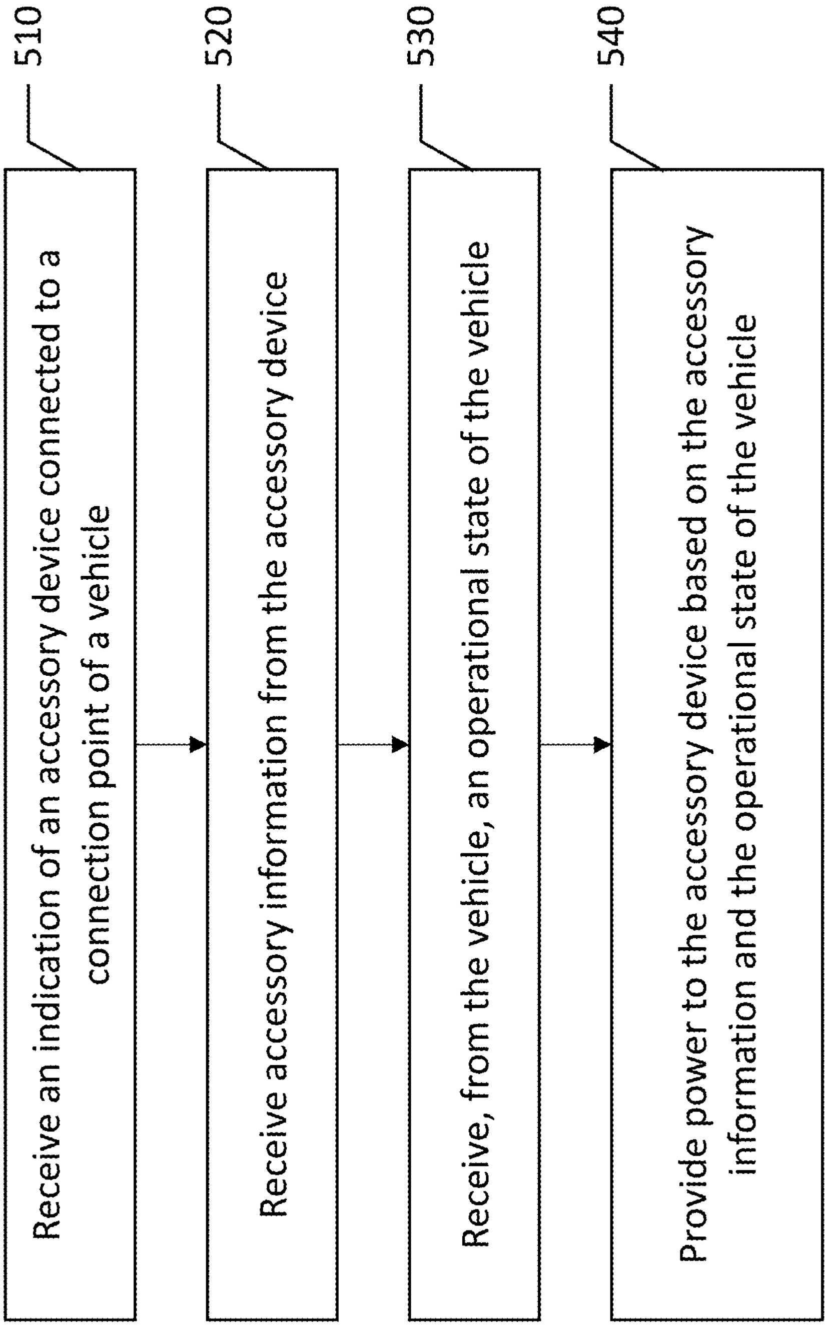

Having thus described certain example embodiments of the present invention in general terms, reference will hereinafter be made to the accompanying drawings which are not necessarily drawn to scale, and wherein:

FIG. 1 illustrates a schematic diagram of an accessory module for configuring an accessory to a vehicle according to an example embodiment of the present disclosure;

FIG. 2 is a table of accessory types and vehicle states according to an example embodiment of the present disclosure;

FIG. 3 is a table of data types that can be included in accessories according to an example embodiment of the present disclosure;

FIG. 4 illustrates a user interface for configuring an accessory according to an example embodiment of the present disclosure;

FIG. 5 illustrates another user interface for configuring an accessory according to an example embodiment of the present disclosure;

FIG. 6 illustrates a user interface for configuring a vehicle based on accessories present according to an example embodiment of the present disclosure;

FIG. 7 illustrates a block diagram of a controller configured for operating accessories according to an example embodiment of the present disclosure; and FIG. 8 illustrates a flow chart of a process for configuring and operating accessories according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Embodiments described herein generally relate to automatically detecting accessories, and more particularly, to automatic detection and configuration of accessories for a vehicle upon connection of the accessory. Vehicle accessories, as described herein, include vehicle hardware that is added to a vehicle after the vehicle has left the assembly line. These are things that are generally not found on a standard production model. These accessories can be original equipment manufacturer (OEM) accessories or third-party aftermarket accessories. Further, embodiments described herein can include accessories that are dealer-installed at or prior to a sale, or after a vehicle is purchased. In many cases, hobbyists and vehicle customization shops install accessories on vehicles.

Accessorizing vehicles has existed since vehicles were first made, and the variety of accessories available is virtually infinite. Accessorizing vehicles can be done to make a vehicle unique or to suit an owner's particular tastes but can also be done for functional purposes. Recreational accessorizing of vehicles is common; however, commercial accessorizing is also a significant market. Vehicles such as emergency vehicles (e.g., police cars, ambulances, etc.) require accessories that are not part of a standard production vehicle. Similarly, there are vehicles customized for specific commercial activities that require non-production accessories. Vehicles such as vans used for plumbing, trucks used for landscaping, and various other special purposes.

Accessories, and particularly hardwired accessories that draw power, can be challenging to properly install in a vehicle. Accessories that are "universal fit" or not designed for a specific model of vehicle may have particular installation and configuration issues. Even OEM accessories may not be easily installed. The adoption of accessories on vehicles is increased with, among other factors, ease of installation and configuration. Making an accessory easy to install and configure across a wide range of vehicles renders that accessory much more desirable and accessible, particularly to the do-it-yourself (DIY) market that may want to install accessories, but may not be mechanically or electrically inclined.

Embodiments described herein of automatically detected and configured vehicle accessories are applicable to any hardwired accessory for any type of vehicle, as will be appreciated by one of ordinary skill in the art.

Installing accessories in or on a vehicle generally involves hardware mounting (e.g., mounting of fog lights to a bumper), and in the case of components drawing electrical power, connecting the wiring of the accessory to the vehicle in some manner. Accessories that are wired to a vehicle's electrical system are generally wired based on whether they require continuous power (e.g., a dashboard camera for security/safety) or "key-on" power.

The term "key-on" power refers to when a vehicle is in accessory mode. Accessory mode includes when electrical systems of a vehicle are operating, but the engine/motor is not running. The accessory mode historically was a first detent in rotation of a key in an ignition lock cylinder, prior to the "run" position and "start" positions. As a mechanical key is giving way to push-button vehicle starting, the process of entering accessory mode is now different for many vehicles. In push-to-start or push-button start vehicles, accessory mode is generally entered when the start button is pushed while the brake pedal is not depressed. Beyond accessory mode is when a vehicle is running. These three modes: vehicle off, accessory mode, and run mode will be used herein to describe the above-referenced status of a vehicle.

Conventionally, vehicle accessories that require power are connected to 12-volt source power from the vehicle, whether from a constant power or switched power source. These 12-volt accessories can be hard-wired into a circuit of a vehicle or connected to an auxiliary connection port, such as the ubiquitous "cigarette lighter" port. The vehicle is unaware of the presence of such accessories as the only indication is a current drain when they are powered on. The accessories are similarly unaware of the source of the power as the accessory is only aware of whether power is present or not.

Embodiments described herein provide a smart accessory connection where accessories that are connected to a vehicle are identified and configured upon connection. According to an example embodiment described herein, a vehicle includes one or more connection ports into which accessories may be connected. These ports can be a standardized port, such as a cigarette lighter adapter, or a proprietary connector. Optionally, the ports may be keyed to limit the types or styles of connectors that can be connected to the ports. This may be useful for ensuring a particular brand or standard of accessory is used. However, embodiments described herein may optionally provide a unique connection port that is standardized to become a new automotive accessory connection port.

Embodiments described herein include accessories that employ power leads to power the accessory, but also include at least one wire used to communicate information about the accessory to the vehicle. The accessory information may be communicated, for example, via 1-Wire® protocol. The 1-Wire® protocol is a wired half-duplex serial bus providing low-speed data communication and supply voltage over a single wire. Employing a protocol such as the 1-Wire® protocol, an accessory can be detected by the vehicle and the vehicle can identify any relevant parameters pertaining to the accessory by reading the information stored as the identification of the accessory. Embodiments can employ communication protocols other than 1-Wire® including those that require more than a single wire as will be appreciated by one skilled in the art.

Vehicle accessories requiring power can include a memory that stores thereon data that can include an address, a checksum, and any parameters that can be specified relating to the accessory. The address can correlate to a human readable name that can be retrieved from a table and displayed on a user interface when the accessory is detected. The accessory can provide an indication of a type of accessory, a power requirement, operational characteristics, configurable parameters, or the like. Embodiments can be employed on any type of powered accessory, such as auxiliary lights (e.g., fog lights, off-road lights, etc.), ornamental lights (e.g., colored LEDs), cameras, infotainment devices, head units, speakers, auxiliary batteries (e.g., a "jump pack"), hydraulic components (e.g., jacks, lifts, etc.), air pumps, power-deployed running boards, etc. Each of these accessories can benefit from the vehicle understanding what the accessory is when it is installed. Upon connecting an accessory as described herein, a notification can be provided on a user interface that a new accessory has been detected, and based on the address, an identification of the name of the accessory can be presented. This enables the user to confirm that an accessory was properly connected, and that it will be controlled according to the power demands of that accessory.

A vehicle employing embodiments described herein can alter how power is supplied to connected accessories based on the information known about the accessory. Vehicle state changes can alter how an accessory is to be used. For example, vehicle speed, on or off-road mode, forward/reverse/park engagement, etc. With vehicle state information and accessory information, accessory power can be controlled.

FIG. 1 illustrates an example embodiment of an accessory module 100 that can control the power output to an accessory 110. The accessory 110 can be connected or plugged in to an accessory connection port. The accessory connection port, connected to the accessory module 100, can provide power along 102 to the accessory 110, and the accessory 110 can provide to the accessory module 100 via a connection 112 (e.g., 1-Wire®), information associated with the accessory stored in ROM 115. The accessory information is received by accessory input 130 via CPU 135, and that information can be communicated to the vehicle architecture 140. The buses between the vehicle architecture 140 and the accessory module 110 can include any number of different types of buses, such as CAN (computer area network), LIN (local interconnect network), Ethernet, etc. The vehicle architecture 140 includes vehicle state information pertaining to any function of the vehicle (e.g., speed, gear, terrain type, weather, etc.). The vehicle architecture provides vehicle state information to the accessory module 100. The vehicle state information is received at the output control 120 and processed to establish the power output to the accessory 110. The output control 120 further includes open circuit and short circuit detection 125 to prevent overload and to prevent damage to the vehicle or the accessory. Based on the vehicle state information and the accessory information, the power output is determined and provided.

The accessory module 100 may receive the accessory information from ROM 115 along connection 112 before power is supplied to the accessory such that a determination can be made as to the power level to be provided and whether conditions are met to power the accessory. The connection 112 may thus provide sufficient power to read/ retrieve the accessory information. Alternatively, power could be supplied along connection 102 to the accessory to provide at least sufficient power to receive the accessory information.

FIG. 2 illustrates a table of an example embodiment of a plurality of accessories and a functional state of the accessories given different states of the vehicle. The table of FIG. 2 represents a supplied power schedule established based on a state of the vehicle that is dependent upon the accessory identification. The functional state of the accessories varies based on the type of accessory they are and when they should be used. For example, a USB Power Strip and Refrigerated Cooler are powered at all times when plugged in. These accessories may be needed even when a person leaves his/her vehicle, such that power should be available regardless of key presence or drive state of the vehicle. Conversely, a winch is an accessory that may be considered inaccessible unless the key is present and the vehicle is in accessory mode or in run mode in either park or off road. The winch is also disabled (i.e., power not supplied) when the vehicle is driving in reverse or forward at speeds both above and below thirty miles per hour. This ability to not supply power in these states prevents the winch from operating in inappropriate conditions and also precludes unnecessary power draw which can degrade battery performance, and as is particularly evident in the case of an electric or hybrid vehicle, reduce the available range of the vehicle. Also shown in FIG. 2 is a determination as to whether the accessory is dimmable, where some degree of power is supplied to the accessory that is less than a full power. This will generally apply to lights. However, in the case of a USB power strip or other accessory, there may be a first level of power provided when the vehicle is running, and a different level of power available when the vehicle is parked and the key is not present.

The table of FIG. 2 is an example embodiment and there can be more or fewer vehicle states. For example, there may be more speed categories for driving, the type of weather can impact vehicle state, the time of day, etc. Each accessory can provide an indication of the vehicle states in which the accessory is operable, and if the accessory is dimmable.

FIG. 3 illustrates a table of how data identifying an accessory can be stored on an accessory. The data can include an address and a variety of flags as to when power should be supplied to the accessory. In the illustrated embodiment, most flags are binary. However, the speed state of the vehicle is configurable by the accessory. As shown, a speed can be indicated by the accessory, where the accessory is inhibited above the indicated speed. Further, other non-binary flags for an accessory can include a duty cycle, a maximum duration of on time, or a maximum current draw permitted. A maximum duration of on time may be beneficial for an accessory that is drawing power in a vehicle that is parked for a long period. The maximum on time may limit the amount of power the accessory draws so as not to drain a battery of the vehicle.

The maximum current draw for an accessory can also be used by the vehicle to ensure sufficient current is available for all connected accessories that can be operated concurrently. Some accessories will be inoperable when other accessories are operable, such that a maximum total current draw does not need to consider the sum of those two accessories, but instead the total current draw of all accessories operable at the different vehicle states. If the total current draw possible for accessories is above a threshold amount, a user may be alerted to this through a user interface of the vehicle. The vehicle architecture can also communicate with the accessory module regarding the maximum permissible current draw (either on a particular circuit or overall) and the accessory module can regulate the operation of the accessories.

Accessories can be prioritized by a default list and/or by a user-defined list of priorities. For example, an interior ambient light may be afforded a lower priority than an exterior driving light should total power consumption need to be reduced. This reduction can be due to the maximum current draw being reached, but also due to vehicle range limitations. In an example embodiment, an electric vehicle having less than a predetermined range or battery percentage charge can begin reducing power or eliminating power to certain accessories. Embodiments described herein are able to discern the function of different accessories and thus provide a strategic reduction in overall power consumption through reducing or eliminating power to non-essential accessories. Further, more than one range or percentage charge limit may be used, where accessory power can be reduced to a first level when range/percentage charge falls below a first value, while the accessory power can be further reduced to a second level when the range/percentage charge falls below a second value.

In addition to accessories that have a memory storing information associated with the accessory, incompatible accessories are also able to be powered through the same connectors provided the accessory connectors are not proprietary. If no data is received along connection 112 to the accessory module 100, the power may be provided as would be provided in conventional 12-volt arrangements.

Accessories may optionally be configurable upon being plugged in. According to an example embodiment, an accessory may be plugged in that has configurable aspects. The accessory information contained in the memory and communicated to the accessory module 110 may include that information, and information on how to configure the configurable aspects of the accessory. The accessory module 110 can report the accessory information including the configurable aspects to the vehicle architecture 140. The vehicle can begin a configuration process through a user interface of the vehicle. In an example embodiment, that interface can include an infotainment screen of the vehicle with a display to present a graphical user interface to a user.

The display can present a screen alerting a user to a new configurable accessory having been detected, as shown in FIG. 4 where display 200 presents an indication 210 of the new configurable accessory detection. A user option is provided as to whether the user wishes to configure the accessory immediately, or at a future time. Upon selecting an option to proceed with configuring, another screen may appear as shown in FIG. 5 on display 200. As shown, the detected accessory is an interior light that can be configured in a number of different colors. A user is prompted to select the color of the new interior light. Upon selection, the accessory may be powered according to the vehicle state, such as those shown in FIG. 2, according to the selected configuration. The accessory does not require a data connection to be informed of the configuration. The accessory module 110 may power the accessory 100 using a pulse-width modulated signal according to the selected configuration. Optionally, the configuration can be communicated via the powerline, such as by power pulses when the accessory is powered on.

The accessories as described herein can be implemented in various ways. However, the above-described identification of accessories enables the accessories to be used in their most effective and desirable ways. For example, vehicles that are elevated, such as trucks and SUVs, may be challenging to enter and exit for shorter individuals, those with restrictive clothing, and those with mobility challenges. Running boards are frequently employed to provide at least one additional step between the vehicle cabin and the ground. However, running boards by design hang lower than many parts of the vehicle, and as they generally have a stepping surface, they can accumulate dirt, mud, snow, etc. during travel which diminishes their usefulness. Power-deployed running boards can be used that deploy only during ingress/egress of the vehicle. According to embodiments described herein, power-deployed running boards can be plugged in to a power connection and identified as power-deployed running boards. The vehicle state used to provide power to the power-deployed running boards may include a door-open state, such that when a door opens, the running boards automatically deploy. Optionally, the running boards may be deployed in response to a vehicle state of "unlocked". Vehicles generally auto-lock the doors when they begin to move, such that the doors will generally be unlocked only while people are entering or exiting the vehicle.

As described above, embodiments include accessories that can be identified, and power supplied to those accessories controlled according to the unique specifications of an identified accessory. By including accessory identification information into the accessory itself, embodiments allow for a wide variety of accessories that can be detected and function properly without needing a software update to the vehicle. Vehicles produced with capabilities as described herein can have accessories connected to them years into the future and the ability of the vehicle to adapt to the accessory remains. Accessories are also transferrable between vehicles employing the functionality described herein.

Generic accessory names and categories can be reserved, such as "auxiliary driving light", "pneumatic pump", or the like, and can be encoded into the system and reserved as addresses for corresponding accessories. According to some embodiments, a user can customize a name of a specific accessory through the user interface of an infotainment screen of the vehicle. This system enables third party manufacturers to produce accessories that are compatible with the vehicle, and accessories that can be identified and powered according to their own specifications.

Embodiments described herein provide an apparatus, system, and method for smart accessories that have an added degree of functionality without requiring expensive processing components within the accessory. Accessories of embodiments described herein are plug-and-play while providing a user experience that is substantially improved over existing accessories. Accessory manufacturers can improve user satisfaction implementing the systems described herein.

Embodiments described herein improve user experience with a vehicle and improve user satisfaction with accessories compatible with the vehicle accessory module. Embodiments may further incorporate accessories that are not powered or hardwired but can communicate with the vehicle to identify accessory features. According to an example embodiment, an accessory may include floor mats, luggage, seat covers, air fresheners, beverage containers, etc. These accessories can include an embedded or attached identifier, such as a RFID (radio frequency identification) chip that includes accessory feature information. Optionally, an accessory may include a visual identifier, such as a barcode or QR code that can be scanned to identify accessory feature information. This information can include, for example, a color or color scheme of the accessory. An RFID (or other near-field communication protocol) reader in the vehicle or on the user's phone can detect the presence of the accessories based on detection of the RFID chip of the accessory. Similarly, a vehicle camera or user device can be used to scan a visual identifier of the accessory. The user device can be paired with the vehicle or otherwise communicate with the vehicle to alert the vehicle to an indication of the accessory feature information.

Upon identification of a new accessory introduced to the vehicle, a user may be prompted to alter a vehicle theme or ambiance that corresponds with the detected accessory. For example, upon detection of an RFID chip of an accessory, the vehicle may provide, via a user interface such as the infotainment display, a query for the user asking if they want to update features of the vehicle based on the new accessory features.

FIG. 6 illustrates an example embodiment of a user interface of a vehicle where an accessory has been detected, such as by detection of a near-field communication (NFC) tag or chip (e.g., RFID) within an accessory. The display 300 shows an indication 310 of the new configurable accessory detected, and requests user input as to whether the new accessory warrants any updates to other features of the vehicle. As shown, the new accessory detected are floor mats having a "Red Rallye Theme". This accessory information may be encoded in the NFC tag or chip and may be recognized by the vehicle. In the instant embodiment, a specific theme and color of the new accessory is known, and the user is prompted as to whether he/she wants to update any other elements of the vehicle to correspond to the new accessory.

As shown, the display 300 has requested user input for any updates to the color themes of other aspects of the vehicle. The display or user interface of a vehicle may have a color theme, and updating the display color theme through user interface element 320 may update the display color theme to the Red Rallye Theme. Similarly, the gauge color theme may be updated using user interface element 330. The gauges may be updated not only in color, but in style to correspond with a rally-racing theme, where gauges may be displayed on a digital screen that resemble racing car gauges. The ambient color theme may optionally be updated through user interface element 340, while all color themes may be updated to correspond with the new detected accessory using user interface element 350.

Embodiments described above can be implemented using the vehicle architecture and/or accessory module as shown in FIG. 1. These elements can be embodied as controllers to control functionality of accessories as described herein. FIG. 7 is a schematic diagram of an example of an apparatus, such as a controller 400, that may be implemented to, either directly or indirectly, control accessories that are connected or installed in or on a vehicle. The controller 400 can be implemented as one or more of the vehicle architecture 140 or accessory module(s) 100 of FIG. 1. Each of these modules can be separate modules or be embodied by a single controller, such as the controller 400.

The controller 400 illustrated in FIG. 7 may include or otherwise be in communication with a processor 402, a memory 404, a communications module 406, and a user interface 408. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 402 (and/or co-processors or any other processing circuitry assisting or otherwise associated with the processor) may be in communication with the memory 404 via a bus for passing information among components of the apparatus. The memory 404 may include, for example, one or more volatile and/or non-volatile memories. For example, the memory 404 may be an electronic storage device (e.g., a computer readable storage medium) comprised of gates configured to store data (e.g., bits) that may be retrievable by a machine (e.g., a computing device like the processor). For example, the memory 404 could be configured to buffer input data for processing by the processor 402. Additionally or alternatively, the memory device could be configured to store instructions for execution by the processor.

The processor 402 may be embodied in a number of different ways. For example, the processor 402 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor 402 may include one or more processors configured in tandem via the bus to enable independent execution of instructions, pipelining and/or multithreading. The processor may be embodied as a microcontroller having custom bootloader protection for the firmware from malicious modification in addition to allowing for potential firmware updates.

In an example embodiment, the processor 402 may be configured to execute instructions stored in the memory 404 or otherwise accessible to the processor 402. Alternatively or additionally, the processor 402 may be configured to execute hard coded functionality. As such, whether configured by hardware or software methods, or by a combination thereof, the processor 402 may represent an entity (e.g., physically embodied in circuitry) capable of performing operations according to an embodiment of the present disclosure while configured accordingly. Thus, for example, when the processor 402 is embodied as an ASIC, FPGA or the like, the processor 402 may be specifically configured hardware for conducting the operations described herein. Alternatively, as another example, when the processor 402 is embodied as an executor of software instructions, the instructions may specifically configure the processor 402 to perform the algorithms and/or operations described herein when the instructions are executed. However, in some cases, the processor 402 may be a processor of a specific device (e.g., a vehicle control module) configured to employ an embodiment of the present disclosure by further configuration of the processor 402 by instructions for performing the algorithms and/or operations described herein. The processor 402 may include, among other things, a clock, an arithmetic logic unit (ALU) and logic gates configured to support operation of the processor 402. In one embodiment, the processor 402 may also include user interface circuitry configured to control at least some functions of one or more elements of the steering system 408.

The communications module 406 may include various components, such as a device or circuitry embodied in either hardware or a combination of hardware and software that is configured to receive and/or transmit data for communicating data between an accessory connector, an accessory module, and/or vehicle architecture or vehicle controller as described herein. In this regard, the communications module 406 may include, for example, an antenna (or multiple antennas) and supporting hardware and/or software for enabling communications wirelessly. Additionally or alternatively, the communications module 406 may be configured to communicate via wired communication with other components of a vehicle or a computing device as described herein.

The user interface 408 may be in communication with the processor 402 to receive an indication of an accessory configuration when the controller 400 is embodied as vehicle architecture, or may provide an indication of the detection of a new accessory in some embodiments. The user interface 408 may also be in communication with the memory 404 and/or the communications module 406, such as via a bus.

FIG. 8 illustrates a flowchart of a method and apparatus for automatic detection and configuration of accessories for a vehicle upon connection of the accessory. As shown, the apparatus includes means, such as the processor 402, the communication interface 406 or the like, for receiving an indication of an accessory device connected to a connection point of a vehicle at 510. The connection point can be, for example, an accessory port or power port of the vehicle. The apparatus of this embodiment also includes means, such as the processor 402, the communication interface 406 or the like, for receiving accessory information from the accessory device at 520. The information may be stored at the accessory in a memory, such as in a ROM of the accessory. At 530, the apparatus includes means, such as the processor 402, the communications interface 406 or the like, for receiving an operational state of the vehicle from the vehicle. This operational state can identify if the vehicle is moving, if the vehicle is operating in an off-road mode, or various other states as described above. In addition, the apparatus of this embodiment includes means, such as the processor 402, the communications interface 406 or the like, for providing power to the accessory device at 540 based on the accessory information and the operational state of the vehicle.

As described above, FIG. 8 illustrates a flowchart of methods, apparatuses, computer program products, and systems according to an example embodiment of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory 404 of a controller 400 employing an embodiment of the present invention and executed by the processor 402 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks.

These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the method of FIG. 8 above may comprise a processor (e.g., the processor 402) configured to perform some or each of the operations (510-540) described above. The processor may, for example, be configured to perform the operations (510-540) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-540 may comprise, for example, the processor 402 and/or a device or circuit for executing instructions or executing an algorithm for processing information as described above.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus including at least one processor and at least one non-transitory memory including computer program code instructions, the computer program code instructions configured to, when executed, cause the apparatus to at least:

receive an indication of an accessory device connected to a connection point of a vehicle;

retrieve accessory information from the accessory device, wherein accessory information is retrieved from a read only memory of the accessory device and comprises one or more flags, wherein the one or more flags include a mode of operation according to a vehicle state of a plurality of vehicle states and one or more of: a mode of operation according to a vehicle speed, a maximum current draw, a maximum on time, or a dimming capability of the accessory device, wherein the plurality of vehicle states comprise key present, key not present, reverse, and drive;

configure operation of the accessory device according to the vehicle state and the one or more of the mode of operation according to the vehicle speed, the mode of operation according to the presence of the key, the maximum current draw, the maximum on time, or the dimming capability of the accessory device;

receive, from the vehicle, an operational state of the vehicle; and provide power to the accessory device based on the accessory information and the operational state of the vehicle.

2. The apparatus of claim 1, wherein the accessory information comprises an indication of at least one operational state of the vehicle in which power is to be provided to the accessory device and an indication of at least one operational state of the vehicle in which power is not to be provided to the accessory device.

3. The apparatus of claim 2, wherein the at least one operational state comprises at least one of: a vehicle speed, a vehicle accessory mode, a vehicle run mode, a vehicle park engaged, a vehicle reverse engaged, a vehicle drive engaged, a vehicle door open status, or a vehicle door lock status.

4. The apparatus of claim 3, wherein the accessory information further comprises at least one of: a maximum duty cycle, a maximum allowed current draw, or a maximum continuous on time.

5. The apparatus of claim 1, wherein causing the apparatus to provide power to the accessory device based on the accessory information and the operational state of the vehicle comprises causing the apparatus to provide a level of power to the accessory device specified in the accessory information.

6. The apparatus of claim 1, wherein causing the apparatus to receive accessory information from the accessory device comprises causing the apparatus to receive accessory information via a single wire that is not used to power the accessory device.

7. The apparatus of claim 1, wherein the accessory information further comprises an indication of configurability of the accessory device, wherein the indication of configurability is provided to the vehicle, and wherein a configuration of the accessory device is received from the vehicle, wherein the apparatus is further configured to provide power to the accessory device based on the accessory information, the operational state of the vehicle, and the configuration of the accessory device.

8. The apparatus of claim 1, wherein power is initially supplied to the accessory device sufficient only to retrieve the one or more flags from the read only memory.

9. The apparatus of claim 1, wherein the accessory information is stored on the read only memory as an address and a series of flags, wherein the address and the series of flags provide all configurable information associated with the accessory device.

10. The apparatus of claim 1, wherein the plurality of vehicle states further include a drive state below a predetermined low speed and a drive state above a predetermined high speed.

11. The apparatus of claim 1, wherein the one or more flags comprise bits identifying an address, wherein the address correlates to a human readable name to be displayed on a user interface when the accessory is detected.

12. A method comprising:

receiving an indication of an accessory device connected to a connection point of a vehicle;

retrieving accessory information from the accessory device, wherein accessory information is retrieved from a read only memory of the accessory device and comprises one or more flags, wherein the one or more flags include a mode of operation according to a vehicle state of a plurality of vehicle states and one or more of: a mode of operation according to a vehicle speed, a maximum current draw, a maximum on time, or a dimming capability of the accessory device, wherein the plurality of vehicle states comprise key present, key not present, reverse, and drive;

configuring operation of the accessory device according to the vehicle state and the one or more of the mode of operation according to the vehicle speed, the mode of operation according to the presence of the key, the maximum current draw, the maximum on time, or the dimming capability of the accessory device;

receiving, from the vehicle, an operational state of the vehicle; and providing power to the accessory device based on the accessory information and the operational state of the vehicle.

13. The method of claim 12, wherein the accessory information comprises an indication of at least one operational state of the vehicle in which power is to be provided to the accessory device and wherein the accessory information further comprises an indication of at least one operational state of the vehicle in which power is not to be provided to the accessory device.

14. The method of claim 13, wherein the at least one operational state comprises at least one of: a vehicle speed, a vehicle accessory mode, a vehicle run mode, a vehicle park engaged, a vehicle reverse engaged, a vehicle drive engaged, a vehicle door open status, or a vehicle door lock status.

15. The method of claim 12, wherein providing power to the accessory device based on the accessory information and the operational state of the vehicle comprises providing a level of power to the accessory device specified in the accessory information.

16. The method of claim 12, wherein receiving accessory information from the accessory device comprises receiving accessory information via a single wire that is not used to power the accessory device.

17. The method of claim 12, wherein the accessory information further comprises an indication of configurability of the accessory device, wherein the indication of configurability is provided to the vehicle, and wherein a configuration of the accessory device is received from the vehicle, wherein the method further comprises providing power to the accessory device based on the accessory information, the operational state of the vehicle, and the configuration of the accessory device.

18. The method of claim 12, further comprising:

receiving an indication that a new accessory is present within the vehicle; and providing for display of a user-interface including options for configuring the vehicle according to one or more properties of the new accessory.

19. A computer program product comprising at least one non-transitory computer-readable storage medium having computer-executable program code portions stored therein, the computer-executable program code portions comprising program code instructions configured to:

receive an indication of an accessory device connected to a connection point of a vehicle;

retrieve accessory information from the accessory device, wherein accessory information is retrieved from a read only memory of the accessory device and comprises one or more flags, wherein the one or more flags include a mode of operation according to a vehicle state of a plurality of vehicle states and one or more of: a mode of operation according to a vehicle speed, a maximum current draw, a maximum on time, or a dimming capability of the accessory device, wherein the plurality of vehicle states comprise key present, key not present, reverse, and drive;

configure operation of the accessory device according to the vehicle state and the one or more of the mode of operation according to the vehicle speed, the mode of operation according to the presence of the key, the maximum current draw, the maximum on time, or the dimming capability of the accessory device;

receive, from the vehicle, an operational state of the vehicle; and provide power to the accessory device based on the accessory information and the operational state of the vehicle.

20. The computer program product of claim 19, wherein the accessory information comprises an indication of at least one operational state of the vehicle in which power is to be provided to the accessory device, wherein the accessory information further comprises an indication of at least one operational state of the vehicle in which power is not to be provided to the accessory device.

* * * * *